(12) United States Patent
Foerg et al.

(10) Patent No.: US 10,166,418 B2
(45) Date of Patent: Jan. 1, 2019

(54) FIRE PROTECTION STRIP

(71) Applicant: HILTI AKTIENGESELLSCHAFT, Schaan (LI)

(72) Inventors: Christian Foerg, Lamerdingen (DE); Herbert Muenzenberger, Wiesbaden (DE)

(73) Assignee: HILTI AKTIENGESELLSCHAFT, Schaan (LI)

( * ) Notice: Subject to any disclaimer, the term of this patent is extended or adjusted under 35 U.S.C. 154(b) by 0 days.

(21) Appl. No.: 15/323,780

(22) PCT Filed: Jul. 14, 2015

(86) PCT No.: PCT/EP2015/066012
§ 371 (c)(1),
(2) Date: Jan. 4, 2017

(87) PCT Pub. No.: WO2016/008863
PCT Pub. Date: Jan. 21, 2016

(65) Prior Publication Data
US 2017/0165509 A1 Jun. 15, 2017

(30) Foreign Application Priority Data
Jul. 15, 2014 (EP) ................................. 14176992

(51) Int. Cl.
*A62C 2/06* (2006.01)
*F16L 5/04* (2006.01)
*H02G 3/04* (2006.01)
(52) U.S. Cl.
CPC ................ *A62C 2/065* (2013.01); *F16L 5/04* (2013.01); *H02G 3/0412* (2013.01)

(58) Field of Classification Search
CPC .......... A62C 2/065; F16L 5/04; H02G 3/0412
(Continued)

(56) References Cited
U.S. PATENT DOCUMENTS 4,086,736 A * 5/1978 Landrigan ................. F16L 5/04
248/56
4,109,423 A * 8/1978 Perrain ................... A62C 2/065
52/1

(Continued)

FOREIGN PATENT DOCUMENTS

| AT | 385 899 B | 5/1988 |
| WO | 2013/160776 A1 | 10/2013 |

OTHER PUBLICATIONS

International Search Report dated Sep. 4, 2015 in PCT/EP15/066012 Filed Jul. 14, 2015.

*Primary Examiner* — Darren W Gorman
*Assistant Examiner* — Qingzhang Zhou
(74) *Attorney, Agent, or Firm* — Grüneberg and Myers PLLC

(57) ABSTRACT

A fire-protection tape (24) to be laid into gaps (12) in walls or ceilings (10) of buildings, having at least two main plies (26a, 26b) composed of an intumescent material, and at least one intermediate ply (30a) composed of a second intumescent material disposed between adjacent main plies (26a, 26b), wherein the second intumescent material has a lower intumescence temperature than the material of the main plies (26a, 26), and wherein the main plies (26a, 26b) have a first longitudinal edge (32a, 32b) on one outer side and a second longitudinal edge (34a, 34b) on the opposite outer side, in each instance.

16 Claims, 4 Drawing Sheets

Figure 1:
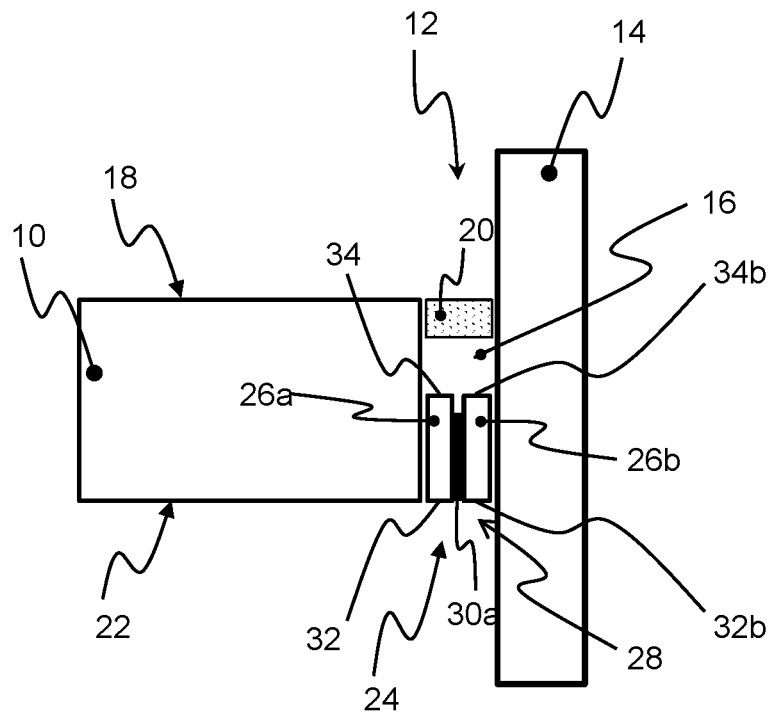

(58) Field of Classification Search
USPC ............... 169/16, 54; 52/220, 220.1, 220.8;
239/273, 282, 283, 280
See application file for complete search history.

(56) References Cited

U.S. PATENT DOCUMENTS

| | | | | |
|---|---|---|---|---|
| 4,424,867 A * | 1/1984 | Mallow | ................... | C04B 40/06 |
| | | | | 156/48 |
| 4,796,401 A * | 1/1989 | Wexler | ................... | A62C 2/065 |
| | | | | 52/1 |
| 4,918,761 A * | 4/1990 | Harbeke | ................ | E03D 11/16 |
| | | | | 249/39 |
| 5,105,592 A * | 4/1992 | MacMillan | ............... | F16L 5/04 |
| | | | | 52/232 |
| 5,452,551 A * | 9/1995 | Charland | ............... | A62C 2/065 |
| | | | | 52/1 |
| 6,405,502 B1 * | 6/2002 | Cornwall | ............... | F16L 5/04 |
| | | | | 285/42 |
| 2010/0294519 A1 * | 11/2010 | Beele | .................... | A62C 2/065 |
| | | | | 169/45 |

* cited by examiner

FIRE PROTECTION STRIP

The invention relates to a fire-protection tape to be placed into gaps in walls or ceilings of buildings.

Various systems are known for preventing the spread of fire or smoke in buildings, which systems can close openings or gaps in ceilings or walls in the event of a fire. Frequently, components having an intumescent material are used for this purpose, which components are disposed on or in the opening. If a fire occurs, the intumescent material foams up due to the rising temperature, and closes the opening in this manner, thereby preventing or at least delaying the spread of smoke or fire through this opening.

The intumescent material is delivered as a fire-protection tape, for example, which can be laid into openings or wall gaps. This allows flexible adaptation to the shape and the size of the opening and to the lines that are laid through these openings.

For optical reasons, the fire-protection tapes are usually laid into the opening or the gap. However, this has the disadvantage that in the event of a fire, the face side of such a tape or of a cuff having such a fire-protection tape, which side faces the fire first, is exposed to the high temperatures with a relatively small surface. The material foams up at this face side, and as a result, because of the insulating properties of the foamed material, shielding of the material that lies behind it, against the rising temperatures, takes place. The material that lies behind it therefore only becomes active with a time delay, since the temperature increase is slowed down by the material that has already foamed up. This effect is additionally reinforced, for example, in that the fire-protection tape is additionally shielded or actually cooled by the walls that lie against it, particularly if the fire-protection tape is embedded in the wall or the ceiling.

This problem particularly occurs in the case of large-volume lines, for example sewer lines, which are laid through the gaps. These are frequently produced from a material having very thin walls, which has a melting point below the activation temperature of the intumescent material of the fire-protection tape. Usual materials for such pipes are, for example, polyethylene or polypropylene, which have a melting temperature of 130° C. to 145° C. and 160° C., respectively. The intumescent materials usually have an activation temperature of approximately 200° C.

In order to eliminate this problem, material combinations are known from the state of the art, for example from EP 2 088 183 A1 or U.S. Pat. No. 5,137,658 A, which combinations have a propellant that has a lower activation temperature, in addition to the intumescent material. These material combinations have a quasi two-stage intumescence, thereby causing a volume increase to already occur at a low temperature. However, the problem that a surface that has already foamed up shields the layers that lie underneath also exists with these material combinations.

A further solution possibility is known from DE 20 2012 003 405 A1. According to this document, the intumescent material has channels that extend from the surface into the material. These channels are supposed to allow faster heating of the fire-protection tape, because of the increased surface area. However, as soon as the material begins to foam up, these channels are closed, so that their effect is reduced.

It is the task of the invention to provide a fire-protection tape to be laid into gaps in walls or ceilings of buildings, which tape can expand completely more rapidly and can reliably close off a larger cross-section.

To accomplish the task, a fire-protection tape to be laid into gaps in walls or ceilings of buildings is provided, having at least two main plies composed of an intumescent material, which plies have a first longitudinal edge on one outer side and a second longitudinal edge on an opposite outer side, in each instance, and at least one intermediate ply disposed between two adjacent main plies, composed of a second intumescent material, wherein the second intumescent material has a lower intumescence temperature than the material of the main plies.

According to the invention, two intumescent materials are therefore used. However, these are not mixed with one another, but rather disposed in separate plies, one on top of the other. The intermediate ply composed of the second intumescent material is activated at a lower temperature, so that it presses the two adjacent main plies, which have not yet foamed up, apart from one another. The surface area of the face side of the fire-protection tape is thereby increased, so that a larger region of the intumescent material is exposed to the heat or the fire and can be activated by it. Furthermore, the main ply that lies radially inward is moved into the gap before it foams up, away from the edge of the gap, by the intermediate ply. The main plies, which are at a distance from one another, can thereby fill a significantly larger volume, in other words close a gap having a larger cross-section. In particular, the main ply that lies on the inside can be moved, by the intermediate ply, into a cavity that is formed by the melting line.

The intermediate ply can be disposed between the main plies in different ways. For example, the intermediate ply extends over the entire surface between the main plies, in other words from the first longitudinal edges all the way to the second longitudinal edges. By means of this placement of the intermediate ply, the main plies are completely pressed apart from one another, so that the volume and the surface area of the fire-protection tape are increased.

In an alternative embodiment, the intermediate ply is disposed only at the first longitudinal edges of the main plies, and the second longitudinal edges of the main plies are flexibly connected with one another without the presence of an intermediate ply. In this embodiment, the main plies can be quasi folded apart from one another about the second longitudinal edges, so that one of the two main plies stands away at an angle to the other main ply. In the event of a fire, the intermediate ply is already activated and foamed up at a temperature below the activation temperature of the main plies. The main plies are thereby spread apart, so that the main ply that lies on the inside is quasi set upright in the gap. As a result, the cross-section through which smoke or fire can enter is already clearly reduced. Furthermore, a surface, particularly of the main ply that lies on the inside, is exposed to the fire or to the rising temperatures, so that more rapid complete activation of the main plies takes place. Preferably, such a fire-protection tape is laid into the gap in such a manner that the first longitudinal edges, at which the intermediate ply is situated, are situated closer to the outer side of the wall or of the ceiling, and rapid heating of the intermediate ply and therefore unfolding of the main plies is ensured.

In this embodiment, the main plies are preferably connected flexibly with one another, in such a manner that they gape apart when the intermediate ply foams up, and a significantly larger surface area is made available, which can be heated by the fire.

For example, a flexible connection means is provided, which flexibly connects the second longitudinal edges of the main plies, like a pivot bearing. This connection means can be a connection tape, which allows flexible coupling of the main plies with one another. In particular, the connection means can be a woven fiberglass fabric tape, which allows a reliable connection of the main plies with one another even at the high temperatures that occur in the event of a fire.

The connection means can be connected with the main plies in different ways. For example, it is possible that the connection means extends into the two main plies, in other words the main plies are quasi cast around the connection means. This connection allows reliable fixation of the main plies on the connection means, even when the main plies foam up.

Alternatively, it is also possible that the main plies are coupled with the connection means over their full area, particularly glued onto it. In this way, easier connecting of the main plies with the connection means, for example even after production of the main plies, is possible.

Preferably, the connection means is configured in such a manner that the main plies, viewed in cross-section, are spread apart in V shape by the intermediate ply, in other words quasi gape open. However, it is also possible that the connection means is configured in such a manner that the main plies can be pressed apart parallel to one another at first. In such an embodiment, the connection means has an intermediate section between the first and the second main ply, by means of which the distance between the two longitudinal edges, relative to one another, is defined. In a starting state, this intermediate section is particularly folded, so that it can be disposed on the fire-protection tape between the main plies, in space-saving manner, for example.

The fire-protection tape can also have multiple main plies, between which an intermediate ply is provided, in each instance. The number of main plies and intermediate plies can be adapted to the desired foaming properties and to the gap to be closed. In the case of such an embodiment, as well, it is possible that the intermediate plies extend from the first all the way to the second longitudinal edges of the adjacent main plies. Alternatively, it is conceivable that the intermediate plies are disposed on one of the longitudinal edges of adjacent main plies and that the opposite longitudinal edges of the adjacent plies are flexibly connected with one another.

In such an embodiment, it is conceivable, for example, that at least three main plies composed of an intumescent material are provided, wherein an intermediate ply is provided only at one of the two longitudinal edges, between the adjacent main plies, and that subsequent intermediate plies are alternately provided only at the first or the second longitudinal edges. Preferably, the edges at which no intermediate ply is provided are connected with one another by a flexible connection means, in each instance, so that the main plies are coupled in accordion-like manner with the connection means. In this embodiment, the main plies are alternately pressed apart from one another at opposite edges in the event of a fire, in other words pressed apart in accordion-like manner. Rapid expansion of the fire-protection tape is possible by means of the intermediate plies provided alternately at the two longitudinal edges, independent of the side of the wall on which the heat development takes place.

In this embodiment, multiple separate connection means can be used, which connect two adjacent main plies, in each instance. However, it is also possible that all the main plies are connected with a single connection means that extends through the fire-protection tape in accordion-like manner.

The intermediate ply can merely be laid in between the main plies. In order to prevent the intermediate ply from falling out, however, the intermediate ply is connected with at least one of the adjacent main plies, with shape fit and/or material fit.

At least one of the main plies can have ribs and/or channels that run transverse to one of the longitudinal edges, extending away from the longitudinal edge, by means of which better temperature introduction into the respective main ply and more rapid activation of the intumescent material, particularly of the intermediate ply, is possible.

Furthermore, a separating layer, particularly a separating film, can be provided between adjacent main plies and/or between an intermediate ply and the adjacent main plies that lie against the intermediate ply. This separating film prevents the main plies from sticking to one another, so that they can be pressed apart more easily upon activation of the intumescent intermediate ply.

In order to protect the fire-protection tape during installation or during placement of lines into the gap, a textile ply is provided, for example, which sheathes the fire-protection tape on the outside, at least in part. The textile ply can be configured in U shape, for example, considered in cross-section, and, at the same time, can have the function of a flexible connection means that connects two main plies that lie on the outside with one another. In this embodiment, the longitudinal edges at which the intermediate ply is provided are kept free, i.e. the textile ply is interrupted at these edges, so that the main plies can be easily pressed apart by the intermediate ply.

Figure 2:
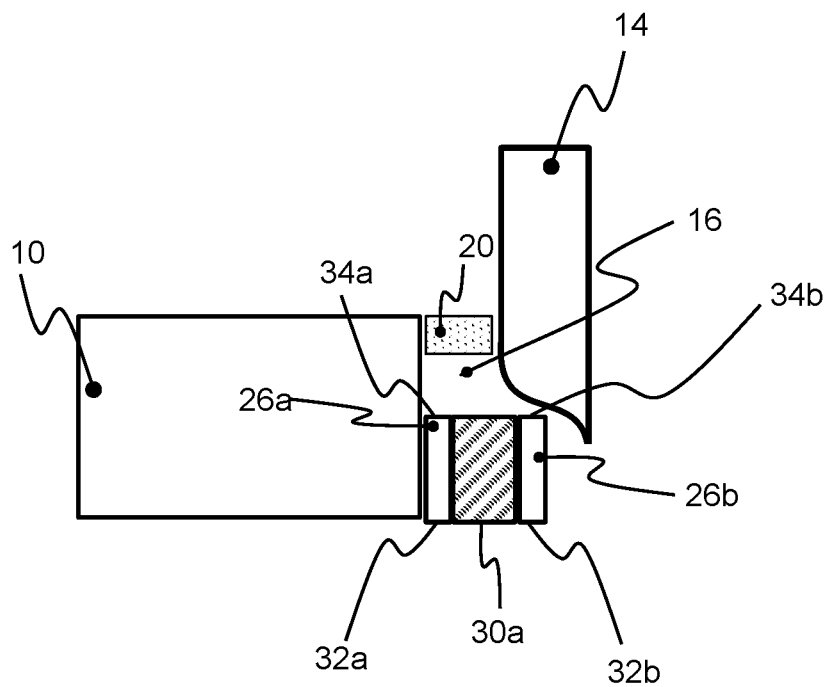
Figure 3:
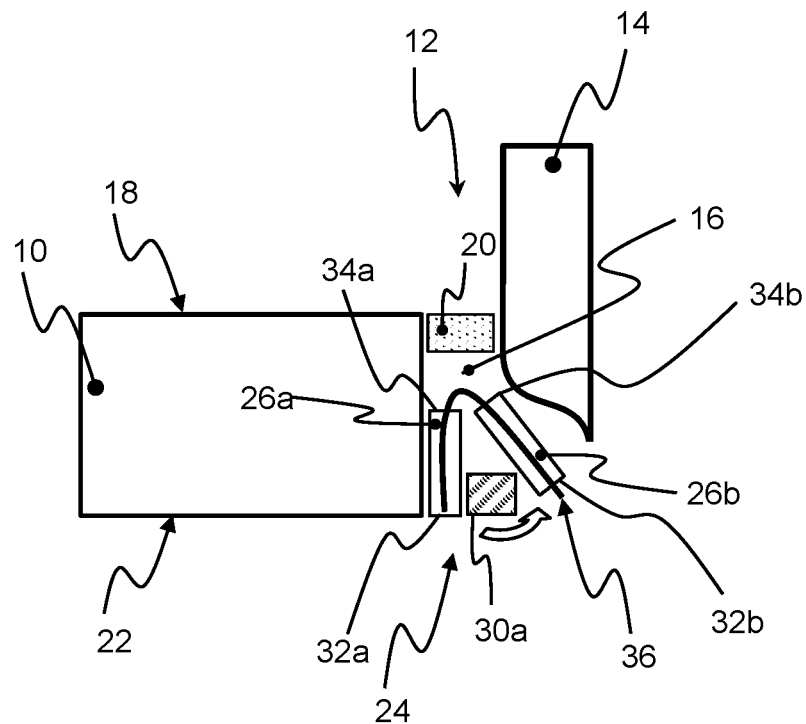
Figure 4:
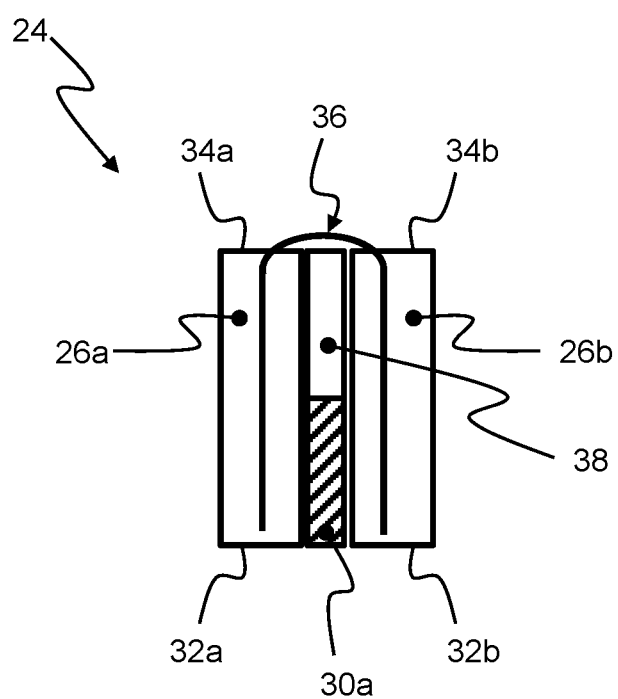
Figure 5:
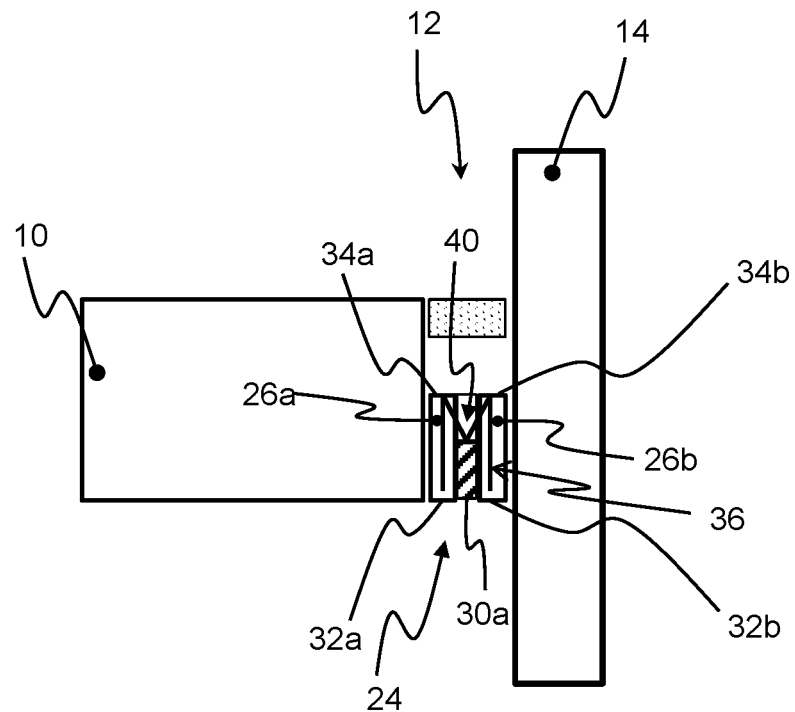
Figure 6:
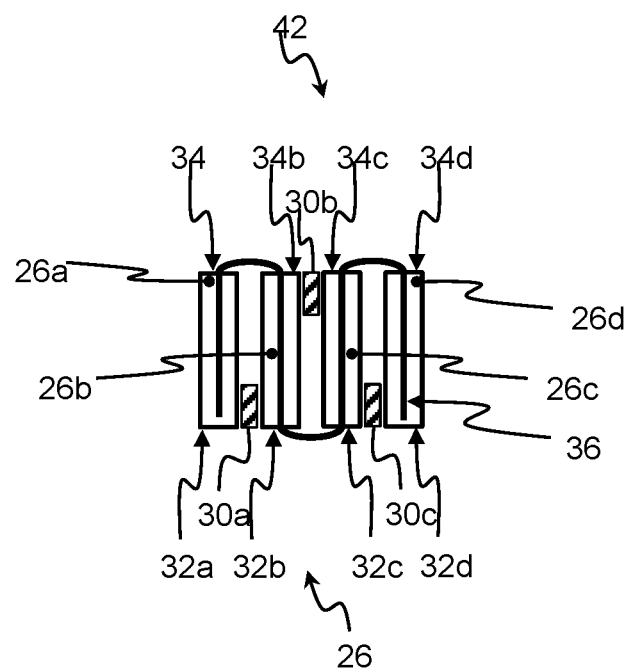
Figure 7:
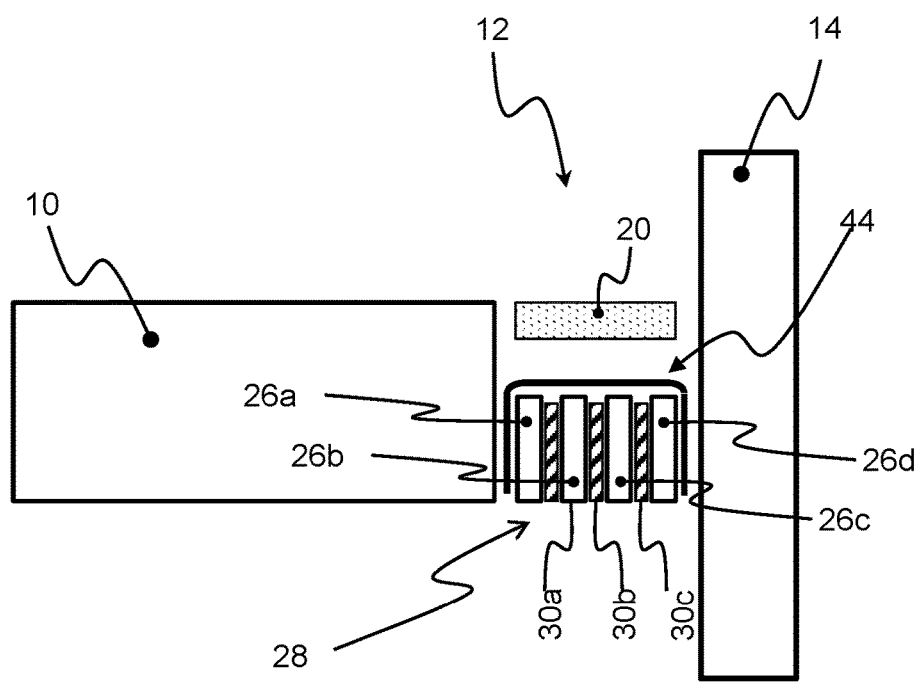

Further advantages and characteristics are found in the following description in connection with the attached drawings. These show:

FIG. 1 a first embodiment of a fire-protection tape according to the invention, in the installed state, FIG. 2 the fire-protection tape from FIG. 1 in the foamed-up state, FIG. 3 a second embodiment of a fire-protection tape according to the invention, after activation of the intermediate ply, FIG. 4 a third embodiment of a fire-protection tape according to the invention, FIG. 5 a variant of the fire-protection tape according to FIG. 4, FIG. 6 a fourth embodiment of a fire-protection tape according to the invention, and FIG. 7 a fifth embodiment of a fire-protection tape according to the invention.

In FIG. 1, a ceiling 10 of a building is shown, which has a gap 12 for a line 14. The line 14 is, for example, a sewer pipe composed of polyester or polypropylene, which can additionally have acoustic insulation composed of mineral materials. A ring-shaped slit 16 is present between the line 14 and the ceiling 10. On the top side 18, this slit is closed off by a sealing element 20. On the underside 22 of the ceiling 10, a fire-protection tape 24 is provided, the structure and function of which will be explained below.

The fire-protection tape 24 has the task of closing off the gap 12 in the event of a fire, in order to prevent or delay entry of smoke or fire, in that the fire-protection tape foams up and closes off the gap 12. For this purpose, it is necessary for the fire-protection tape 24 to not only be able to fill the slit 16, but also the entire gap 12, because the material of the line 14 has a lower melting point and therefore can melt or constrict at the temperatures that occur during a fire (see also FIG. 2). These lines are produced, for example, from polyester, which has a melting temperature between 130° C. to 145° C., or polypropylene, having a melting temperature of 160° C.

The fire-protection tape 24 is supplied as an endless material, for example on a roll, and laid circumferentially around the line 14, into the gap 12 or the slit 16. In the embodiment shown here, the fire-protection tape 24 fills the slit 16 completely in the radial direction, so that in the installed state of the fire-protection tape 24, a sound-proofing function already exists between the underside 22 and the top side 18. However, it is also possible that when the fire-protection tape 24 is laid in, a slit is present between the fire-protection tape and the line 14.

The fire-protection tape 24 consists of two main plies 26a, 26b, which extend in the longitudinal direction of the fire-protection tape 24, in other words around the line in the installed state, in the circumference direction. The main plies 26a, 26b consist, in each instance, of a first intumescent material, in other words a material that foams up at high temperatures and thereby increases its volume. The gap 12 can be closed by means of this volume increase, so that smoke and fire cannot enter through the gap 12.

As can be seen in FIG. 1, the face surface 28, which is exposed to the high temperatures in the event of a fire, is relatively small. In the case of strong heat development, only the material at the face surface 28 would react and foam up at first. However, in the case of the previously known fire-protection tapes, insulation of the material of the main plies 26a, 26b that lies behind the face side, relative to the increasing heat, would take place as the result of foaming, so that a delay in the foaming process would come about.

Furthermore, shielding of the heat or cooling of the material of the main ply 26a, which lies directly against the ceiling 10, takes place by means of the material of the ceiling 10.

The intumescence temperature of the intumescent materials usually used for such fire-protection tapes furthermore lies clearly higher than the melting temperature of the material from which the line 14 is produced. Usual temperatures for activation of an intumescent material lie at 200° C.

The line would therefore melt before the intumescent material foams up, so that a larger cross-section has to be closed. As can be seen in FIG. 2, the line 14 constricts relatively quickly, so that a significantly larger region must be filled by the fire-protection tape 24.

In order to increase the surface area of the fire-protection tape 24 at the beginning of the foaming process and thereby achieve faster foaming of the entire material of the main plies 26a, 26b and closing of the gap 12, an intermediate ply 30a is provided between the adjacent main plies 26a, 26b, which ply consists of a second intumescent material. This second intumescent material has a clearly lower reaction temperature than the material of the main plies, so that it already foams up at lower temperatures.

At the beginning of the foaming process, the intermediate ply 30a is therefore activated first and foams up. The main plies 26a, 26b are pressed apart due to the foaming of the intermediate ply 30a, thereby increasing the surface area that is exposed to the elevated temperatures, for one thing. For another thing, the inner main ply 26b is displaced further into the center of the gap 12. When the main plies 26a, 26b subsequently foam up, these do not reciprocally hinder one another and can furthermore close off a significantly greater volume in the gap 12.

In other words, the intermediate ply ensures that the two main plies 26a, 26b foam up more rapidly and with less hindrance, and can close off the gap 12.

The intermediate ply 30a consists, for example, of an acrylate dispersion that contains a propellant that is activated at a very low temperature. In addition, the intermediate ply 30a can be configured in such a manner that it not only foams up but also reacts strongly exothermically. In this way, the intermediate ply 30a can additionally increase the temperature, so that it is ensured that the adjacent main plies 26a, 26b are activated and expand more quickly.

This acrylate dispersion is applied to the first main ply 26a, for example. Before the intermediate ply 30a hardens, the second main ply 26b is laid onto the intermediate ply 30a, so that these are firmly connected with one another after hardening of the intermediate ply 30a. The intermediate ply 30a therefore does not have to have any supporting properties.

In the embodiment shown here, the intermediate ply 30a extends over the entire width of the main plies 26a, 26b, in other words from a first longitudinal edge 32a, 32b all the way to a second longitudinal edge 34a, 34b. The main plies 26a, 26b are therefore connected with one another over their full area by the intermediate ply 30a. As a result, the second main ply 26a is pushed into the gap 12 in the event of a fire, parallel to and away from the first main ply 26a, as the result of foaming of the intermediate ply 30a.

A second embodiment of a fire-protection tape 24 according to the invention is shown in FIG. 3. In this embodiment, the two main plies 26a, 26b are flexibly connected with one another at the second longitudinal edges 34a, 34b by a flexible connection means 36, for example a woven fiberglass textile tape. The intermediate ply 30a is provided only in the region of the first longitudinal edges 32a, 32b. No intermediate ply is provided at the second longitudinal edges 34a, 34b.

By means of this structure, the main plies 26a, 26b are pressed apart at the first longitudinal edges 32a, 32b when the intermediate ply 30a is activated, while the second longitudinal edges 34a, 34b are held together by the connection means. After activation of the intermediate ply 30a, the main plies 26a, 26b gap apart in V shape, viewed in cross-section. The second main ply 26b is quasi pivoted about the second longitudinal edges 34a, 34b, so that it projects into the gap 12, viewed in cross-section.

The cross-section of the gap 12, through which fire or smoke can pass, is already clearly reduced by the second main ply 26a, which projects at a slant or almost perpendicular into the gap. In this embodiment, significantly more rapid closing of the entire gap 12 is therefore possible as the result of foaming of the second main ply 26b.

In FIG. 4, a third embodiment of a fire-protection tape 24 according to the invention is shown, which is based essentially on the embodiment shown in FIG. 3. A separating layer 38 is additionally provided between the main plies 26a, 26b, by means of which layer the main plies 26a, 26b are separated from one another in the region of the second longitudinal edge 34a, 34b. This separating layer 38 is a film composed of polyethylene, for example, and ensures that the expansion of the intermediate ply 30a is not hindered by the two main plies 26a, 26b sticking together.

In the embodiment shown in FIG. 5, the connection means 36 between the main plies 26a, 26b has a folded intermediate section 40, which also allows the second longitudinal edges 34a, 34b to move away from one another during activation of the intermediate ply 30a.

Independent of the embodiment of the connection means 36, the latter can either be connected with the main plies 26a, 26b over their full area, on the outer side, for example glued onto them. Alternatively, it is also possible that the connection means extends into the main plies 26a, 26b with a section. Production of the fire-protection tape 24 takes place, for example, in that a ply composed of an intumescent material capable of flow or capable of being brushed is cast into a mold. Subsequently, the connection means 36 is laid onto the material. Dependent on how liquid the material is, the connection means 36 can sink into it or remain lying on its surface, and can connect with it with material fit. If the connection means 36 does not sink into the material, further material can be introduced into the mold, so that the connection means 36 is enclosed by it.

Subsequently, the separating layer 38 is applied to the surface, for example laid on. This can take place in the still damp state of the material, so that the separating layer 38 connects with the material with material fit. Subsequently, the intermediate ply is applied to the separating layer.

In a final production step, the material is laid together with the connection means 36, in the not yet hardened state of the material, in such a manner that the intermediate ply is situated between two sections of the material, which define the first and the second ply 26a, 26b, in each instance. If the material has not hardened yet, it is significantly more flexible, so that the folding process is significantly easier.

A further embodiment is shown in FIG. 6. This is based essentially on the embodiment shown in FIG. 3. Instead of two main plies 26a, 26b, however, further main plies 26c, 26d are provided here. The main plies 26a, 26b, 26c, 26d are connected with one another by a continuous connection means 36, wherein the connection means 36 runs essentially in accordion-like manner and alternately connects the two first longitudinal edges 32a and 32b or 32c and 32d and the first longitudinal edges 34b and 34c with one another. The main plies 26a, 26b, 26c, 26d can therefore be unfolded in accordion-like manner.

An intermediate ply 30a, 30b, 30c is provided at the longitudinal edges that are not coupled with one another by way of the connection means 36, in each instance. By means of this arrangement, activation of intermediate plies and thereby an increase in size of the surface area of the fire-protection tape 24 is ensured not only at the first face surface 28, but also, in the event of a fire, at the second face surface 42.

Also in the case of the principle shown in FIG. 1, the use of multiple main plies 26a, 26b, 26c, 26d with continuous intermediate plies 30a, 30b, 30c that lie between them is possible, as can be seen in the embodiment in FIG. 7. In this embodiment, a textile ply 44 is additionally provided, which sheathes the fire-protection tape 24 on the outside, at least in part, wherein the face surface 28 is kept free, so that activation of the intermediate plies 30a, 30b, 30c is not hindered.

Independent of the embodiments shown, the intermediate ply 30a, 30b, 30c can be disposed between two main plies 26a, 26b, 26c, 26d in any desired manner, wherein it only has to be ensured that the intermediate ply 30a, 30b, 30c is activated as quickly as possible by the increasing temperature.

In order to achieve more rapid heat introduction into the main plies 26a, 26b, these can also be provided with ribs or channels, which extend from the first longitudinal edges 32a, 32b or the second longitudinal edges 34a, 34b into the respective main ply 26a, 26b, independent of the embodiment of the fire-protection tape 24.

The invention claimed is:

1. A fire-protection tape, comprising:
   at least two main plies comprising an intumescent material, wherein the plies have a first longitudinal edge on one outer side and a second longitudinal edge on an opposite outer side, in each instance; and
   at least one intermediate ply comprising a second intumescent material disposed between adjacent main plies;
   wherein the second intumescent material has a lower intumescence temperature than the material of the main plies, and
   wherein the intermediate ply is disposed at the first longitudinal edges of the main plies, wherein the second longitudinal edges of the main plies are flexibly connected with one another, such that the main plies are configured to gape apart at the first longitudinal edges after activation of the intermediate ply, and wherein the intermediate ply does not extend to the second longitudinal edges of the main plies.

2. The fire-protection ape according to claim 1, wherein a flexible connector is provided, which flexibly connects the second longitudinal edges of the main plies with one another.

3. The fire-protection tape according to claim 2, wherein the connector extends into the main plies.

4. The fire-protection tape according to claim 2, wherein the main plies are coupled with the connector over their full area.

5. The fire-protection tape according to claim 2, wherein the connector has an intermediate section between the main plies.

6. The fire-protection tape according to claim 1, wherein at least three main plies comprising an intumescent material are provided,
   wherein an intermediate ply is provided only at one of the two longitudinal edges between adjacent main plies, and
   subsequent intermediate plies are provided only alternately on the first longitudinal edges and the second longitudinal edges.

7. The fire-protection tape according to claim 1, wherein the intermediate ply is connected with at least one adjacent main ply with shape fit and/or material fit.

8. The fire-protection tape according to claim 1, wherein a separating layer is provided between adjacent main plies and/or between the intermediate ply and the main plies assigned to them.

9. The fire-protection tape according to claim 1, wherein a textile ply is provided, which sheathes the fire-protection tape on the outside, at least in part.

10. The fire-protection tape according to claim 1, which is placed in a gap in a wall or a ceiling of a building.

11. The fire-protection tape cording to claim 2, wherein the flexible connector is a connection tape.

12. The fire-protection tape according to claim 2, wherein a connector is a woven fiberglass textile tape.

13. The fire-protection tape according to claim 2, wherein the main plies are coupled with the connector over their full area and are glued on.

14. The fire-protection tape according to claim 2, wherein the connector has a folded intermediate section between the main plies.

15. The fire-protection tape according to claim 1, wherein a separating film is provided between adjacent main plies and/or between the intermediate ply and the main plies assigned to them.

16. The fire-protection tape according to claim 1, wherein the at least one intermediate ply is capable of activating and pressing the at least two main plies apart from one another, at a temperature at which the at least two main plies are not activated, thereby increasing a surface area of a face side of the fire-protection tape.

* * * * *